(12) United States Patent
Huseth (10) Patent No.: US 7,733,836 B2
(45) Date of Patent: Jun. 8, 2010

(54) METHOD AND APPARATUS FOR LOCATION ESTIMATION

(75) Inventor: Steve D. Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 11/796,749

(22) Filed: Apr. 30, 2007

(65) Prior Publication Data

US 2007/0201421 A1  Aug. 30, 2007

(51) Int. Cl.
*H04W 4/00* (2009.01)
*H04W 24/00* (2009.01)

(52) U.S. Cl. .......... 370/338; 455/456.1; 455/456.2; 455/456.3; 455/456.4; 455/456.5; 455/456.6

(58) Field of Classification Search .......... 370/338; 455/456.1–456.6, 404.2
See application file for complete search history.

(56) References Cited

U.S. PATENT DOCUMENTS

| 4,706,689 | A | * | 11/1987 | Man ..................... 600/302 |
| 6,662,016 | B1 | * | 12/2003 | Buckham et al. .......... 455/457 |
| 6,738,628 | B1 | * | 5/2004 | McCall et al. ........... 455/456.1 |
| 6,756,901 | B2 | * | 6/2004 | Campman ............... 340/573.1 |
| 7,395,073 | B2 | * | 7/2008 | Gwon et al. ............ 455/456.1 |
| 2002/0019239 | A1 | * | 2/2002 | Kasapidis ............... 455/456 |
| 2004/0002346 | A1 | * | 1/2004 | Santhoff ................ 455/456.1 |
| 2004/0203897 | A1 | * | 10/2004 | Rogers ................. 455/456.1 |
| 2004/0266457 | A1 | * | 12/2004 | Dupray ................. 455/456.5 |
| 2005/0070304 | A1 | * | 3/2005 | Farchmin et al. ......... 455/456.1 |
| 2006/0025158 | A1 | * | 2/2006 | Leblanc et al. .......... 455/456.2 |
| 2007/0087763 | A1 | * | 4/2007 | Budampati et al. ....... 455/456.5 |
| 2007/0178911 | A1 | * | 8/2007 | Baumeister et al. ...... 455/456.1 |
| 2007/0247367 | A1 | * | 10/2007 | Anjum et al. ............ 342/464 |
| 2008/0076430 | A1 | * | 3/2008 | Olson ................... 455/440 |
| 2008/0214203 | A1 | * | 9/2008 | Titli et al. ............. 455/456.1 |

OTHER PUBLICATIONS

"Estimating uncertainty from multiple measurements" <http://web.archive.org/web/20031103051731/http://www.phys.selu.edu/rhett/plab193/labinfo/Error_Analysis/08_Multiple_Measurements.html> SELU, Nov. 2003. Accessed through archive.org on Jun. 15, 2009.*
U.S. Appl. No. 11/298,822, filed Dec. 9, 2005, Kolavennu, Soumitri N.

* cited by examiner

*Primary Examiner*—Lester Kincaid
*Assistant Examiner*—Nathan Mitchell
(74) *Attorney, Agent, or Firm*—Schwegman, Lundberg & Woessner P.A.

(57) ABSTRACT

In one embodiment, a method of estimating location of a mobile beaconing device within a building includes steps: concurrently transmitting from the beaconing device at least first and second signals, which respectively indicates at least first and second transmit power levels thereof; receiving the at least first and second signals by a plurality of anchor devices at different known locations; estimating first distances between the beaconing device and each anchor device as a function of signal power levels of the first signal received by each anchor device, and second distances between the beaconing device and each anchor device as a function of signal power levels of the second signal received by each anchor devices; and calculating an estimated location of the beaconing device as a function of the estimated first distances and second distances.

16 Claims, 9 Drawing Sheets

METHOD AND APPARATUS FOR LOCATION ESTIMATION

CROSS-REFERENCE TO RELATED PATENT DOCUMENTS

This application is related to U.S. application Ser. No. 11/298,822, filed Dec. 9, 2005, which is incorporated herein by reference.

BACKGROUND

In many situations, it is desirable to determine the location and movement of a person or object within a building or relatively well-defined space, such as a home, hospital, or prison. For example, elderly or infirm persons living alone or in a nursing home may need frequent or even relatively constant monitoring by caregivers, and firefighters in a risky building may also need to be tracked.

Some advanced techniques, such as radar, GPS, Time-of-Flight, and Time-Difference-of-Arrival may be used to determine the location and movement of persons or objects. For instance, radar may be used for tracking a person or object, in which an electromagnetic radiation is reflected off the person or object. GPS may also be used for tracking a person or object, in which the person or object may be equipped with a GPS transmitter for transmitting signals which can be received by GPS satellites. However, these techniques require relatively expensive equipment, and might not work effectively under certain circumstances. For example, both radar and GPS systems would not work effectively within a building, because the walls and ceilings of the building would block radar signals as well as block access to GPS satellites.

Relatively less expensive radio technique may also be used to determine the location and movement of a person or object by applying the property that the power level of a radio signal attenuates at a logarithmic rate over distance. Given the signal power level transmitted by a radio transmitter, a radio receiver can measure the received signal power level, and can calculate a distance estimate between the radio transmitter and the radio receiver. Using several radio transmitters at different known locations, a mobile radio receiver is able to determine its own location using trio metric or multilateration calculations. However, this approach based on signal power attenuation will produce an accurate location estimate only in a perfect world devoid of other radio interference or other physical objects absorbing or reflecting radio signals. Since radio signal power level attenuates at a logarithmic rate, the accuracy of distance calculation deteriorates exponentially as the signal power level decreases, thus the accuracy of the estimated location using this approach is significantly affected.

BRIEF DESCRIPTION OF THE DRAWINGS

Some embodiments of the present application are illustrated by way of examples, and not by way of limitations, in the figures of the accompanying drawings in which.

DETAILED DESCRIPTION

In the following description, for purposes of explanation, numerous specific details are set forth in order to provide a thorough understanding of example embodiments. It will be evident, however, to one skilled in the art that the embodiments of the application may be practiced without these specific details.

The term "concurrently" used in the following description denotes that two or more signals are transmitted one after another almost simultaneously or almost at the same time with very short time interval accepted by the radio signal frequency band of a receiver. The interval can be, for example, 50 μsec. In a fixed environment, for fast moving beaconing devices, the interval may be much less. However, for slow move beaconing devices, the interval may be much greater.

The term "signal strength" used in the following description denotes "signal power level" measured in unit dBm. They can be used interchangeably.

The term "controller" used in the following description denotes "control node" in a network system. They can be used interchangeably.

The present application describes a technique to track the position and movement of a mobile person or object carrying a beaconing device within a building. This technique utilizes the principle that the strength of a radio signal attenuates at a logarithmic rate over distance. In one embodiment, a mobile device (beaconing device) concurrently transmits multiple radio frequency (RF) signals with different transmit power levels. A plurality of anchor devices positioned at different known locations receive these multiple signals. Each distance between the beaconing device and each anchor device is estimated as a function of each transmit power level from the beaconing device and each corresponding signal power level received by each anchor device. An estimated location of the beaconing device is calculated as a function of the estimated distances. When calculating the estimated location of the beaconing device, a weighting factor is assigned to each estimated distance. An estimated distance by using a signal having a lower transmit power level may be assigned a higher weight than an estimated distance by using signal having a higher transmit power level to overcome the receiver saturation and multipath effects, which significantly affect the accuracy of the calculated location of the beaconing device. In one embodiment, anchors transmitting at high power levels may be used at long distances from the beaconing device. In one embodiment, an optimal distance measurement band may occur at each power level while continuing to maximize the number of signal power level measurements.

In another embodiment, the plurality of anchor devices work as radio transmitters that concurrently transmit multiple RF signals with different power levels, and the mobile device works as a radio receiver. Each distance between the mobile device and each anchor device is estimated as a function of each transmit power level from each anchor device and each corresponding signal power level received by the mobile device. An estimated location of the mobile device is calculated as a function of the estimated distances. When calculating the estimated location of the mobile device, a weighting factor is assigned to each estimated distance. An estimated distance by using a signal having a lower transmit power level may be assigned a higher weight than an estimated distance by using signal having a higher transmit power level.

Figure 1:
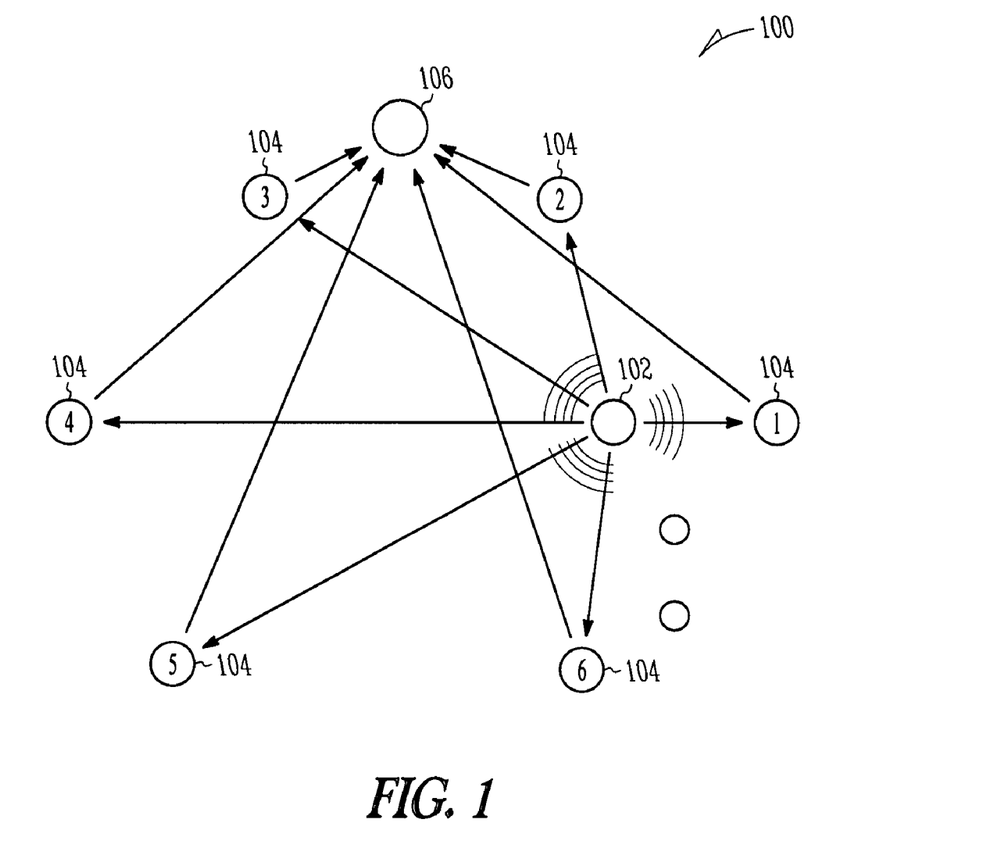
FIG. 1 is a block diagram illustrating the basic components of a tracking system in accordance with an example embodiment of the present application.

FIG. 1 is a block diagram illustrating the basic components of a system 100 in accordance with an embodiment of the present application. In an embodiment, a tracking system 100 for estimating location of a person or object within a building includes a beaconing device 102 carried on the person or object, a plurality of anchor devices 104 positioned at different known locations within a building, and a control node 106 for collecting and processing related information.

In one embodiment, the beaconing device 102 may concurrently transmit multiple RF signals respectively having multiple different power levels, and each power level has its own ID. For example, the beaconing device 102 may each time concurrently transmit three signals which respectively have three different power levels, such as 0 dBm, −10 dBm, and −25 dBm. Here, the term "concurrently" means that the transmissions of the three signals occur subsequently with very short time interval, e.g., about 50 μsec or other intervals in further embodiments. To track the movement of the person or object within the building, the beaconing device 102 may periodically repeat the transmissions of the multiple signals with a constant time interval. The length of the constant time interval depends on the accuracy required. In some embodiments, the length of the constant time interval is inversely proportional to the speed at which the mobile device is moving. For example, for tracking a firefight within a building, the constant time interval between subsequent submissions may be 0.5 second, and for tracking a person at home, the time interval between subsequent submissions may be up to 1 minute.

In some embodiments, if more than one person or object needs to be tracked within a building, each of the transmitted signals from a mobile device 102 should have an ID indicating the mobile device 102. The ID of each mobile device 102 may be a digital number, a particular RF frequency, or any other signal representing the device.

In one embodiment, a plurality of wireless anchor devices 104 are positioned in various known locations within the building for receiving the signals transmitted by the beaconing device 102. The anchors 104 should remain stationary in one embodiment once installed. During each interval, the plurality of anchor devices 104 receive the multiple signals, which are concurrently transmitted from the beaconing device 102. In some embodiments, each anchor device 104 records the ID of each signal transmitted from the beaconing device 102, determines and stores each transmit power level and each corresponding received signal power level. The various IEEE 802.11 specifications provide an exemplary technique for measuring RSSI (Received Signal Strength Indicator) for a received radio signal. This technique would be one way to determine received signal strength (power level). However, the received signal strength may be determined in any fashion.

In one embodiment, the control node 106 (or controller) is located at a node of the wireless network tracking system 100. Each anchor device 104 may send to a controller 106 its own ID, the ID and the transmit power level of each signal of multiple signals transmitted from the beaconing device 102, and the corresponding received signal power level. The control node 106 may correlate the information from the various anchors 104, calculate a distance between the beaconing device 102 and each anchor device 104 and calculate an estimated position of the beaconing device 102. This process is repeated every time the beaconing device 102 transmits its multiple signals. In an embodiment, when there are more than one persons or objects to be tracked, each mobile device 102 may send to the controller 106 a signal uniquely identifying the mobile device 102. The control node 106 may include any reasonable computing devices, such as a microprocessor, PC, ASIC, state machine, processor, combinational logic, and any combination of software and hardware. In some embodiments, the control node 106 may correspond to a function that may be resident in any of the mobile beaconing device 102, the anchor devices 104, as well as a separate device.

In some embodiments, the controller 106 is pre-programmed with the location of each anchor node within the space being monitored so that it can translate information received from the anchor devices 104 into a physical location. The control node 106 may maintain a continuous record of the estimated location of the person. From this record, the movement of the person or object over a period of time can be determined relatively accurately. In one embodiment, the controller 106 may simply store this information for later retrieval by users. The controller 106 may provide this information to users in any reasonable form, such a list of the start and end time of the tracked person in each room or a map showing a trail of the movement of the tracked person with or without time stamps. This information can be used to determine, e.g., whether a person is moving about in a normal or expected fashion. It can also be used to determine if a person is going places within the space that he or she should not be.

In some embodiments, commercially available Ademco™ technology developed by Honeywell International, Inc. can be used in the tracking system 100, which is a radio chip set, and a series of products that incorporate that chip set in conjunction with sensors to form a wireless transceiver security system widely used throughout the United States. The technology may also be used in wireless security systems such as those described above designed for use in home and business wireless security systems. The Ademco technology includes wireless control panels, wireless detectors, and even wireless remote transmitters that can be placed within key fobs, watches, jewelry, or other personal items for remotely enabling or disabling the security system.

Figure 2:
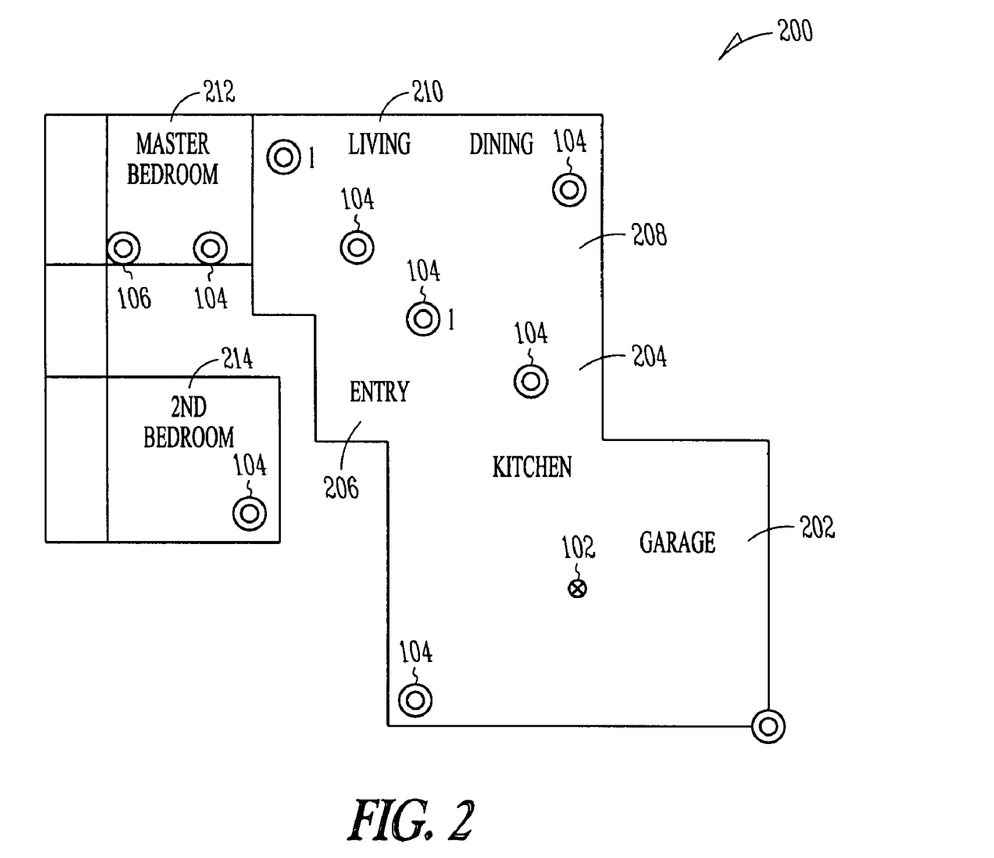
FIG. 2 is a schematic plan view of a household incorporating a tracking system incorporating the principles of the present application in accordance with an example embodiment of the present application.

FIG. 2 is a schematic plan view of a household incorporating a tracking system in accordance with the principles of the present application. For example, a home 200 comprises a garage 202, a kitchen 204, an entryway 206, a dining room 208, a living room 210, and two bedrooms, 212 and 214. Each room may include an anchor device 104. A controller 106 may be positioned in the bedroom 212. The system includes one or more wireless beaconing devices 102 carried on the person or persons to be monitored. Preferably, all communications between nodes of the network are wireless.

Figure 3:
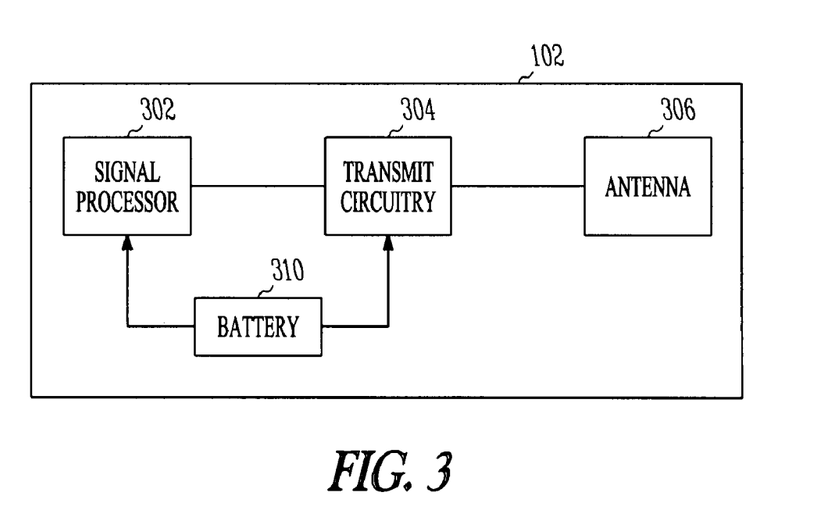
FIG. 3 is a block diagram illustrating the components of one of the wireless beaconing devices illustrated in FIG. 1 in accordance with an example embodiment of the present application.

FIG. 3 is a block diagram illustrating the components of one of the wireless beaconing devices of FIG. 1 in accordance with the present application. The beaconing device 102 may contain minimal signal processing capabilities so that it can be made as small and light weight as possible whereby it can be easily worn or carried by the monitored individuals. In an embodiment, the beaconing device 102 contains signal processing circuitry 302 for generating the signal to be transmitted. It further comprises transmitter circuitry 304 for conditioning the signal for RF transmission. For example, the transmitter circuitry 304 might include circuitry for converting the signal from digital to analog form, frequency up-converting the signal to RF and other signal conditioning circuitry that would be well within the understanding of those of skill in the art. The beaconing device 102 may further include a transmission antenna 306. The signal processing circuitry 302 and transmitter circuitry 304 may be provided by one or more ASICs, microprocessors, analog hardware, digital hardware or any other reasonable technology. The transmit circuitry 304 may output the transmit signal to the antenna 306 for transmission. The beaconing device 102 may be powered by a long-life, small, lightweight battery 310. In some embodiments, each beaconing device 102 transmits a binary signal that uniquely identifies that beaconing device 102. The tracking system 100 may be programmed to know what individual is carrying that particular beaconing device so as to be able to identify the individual from the particular ID.

Figure 4:
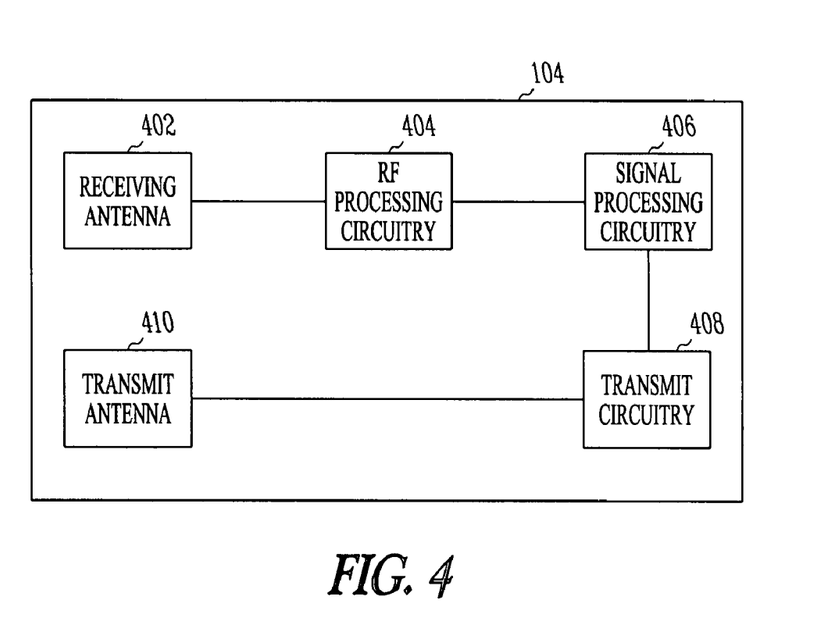
FIG. 4 is a block diagram illustrating the components of one of the wireless receivers illustrated in FIG. 1 in accordance with an example embodiment of the present application.

FIG. 4 is a block diagram illustrating the components of one of the wireless receivers of FIG. 1 in accordance with the present application. In an embodiment, each anchor device 104 includes a receiving antenna 402, and a RF processing circuitry 404 coupled to the antenna 402 for extracting the signal received from the beaconing devices 102. The RF processing circuitry 404 typically includes a circuitry for frequency down converting the received RF signal to a baseband signal and converting it from analog to digital. Each anchor device 104 may further include signal processing circuitry 406 for at least determining the received signal power level. In some embodiments, circuitry 406 determines the particular ID of the signal received. In some embodiments, circuitry 406 also receives the ID of the beaconing device 102. The anchor device 104 also includes transmit circuitry 408 and a transmit antenna 410 for transmitting the signal power level information and/or ID information to the control node 106. The receiving antenna 402 and transmit antenna 410, of course, may be the same single antenna.

Figure 5:
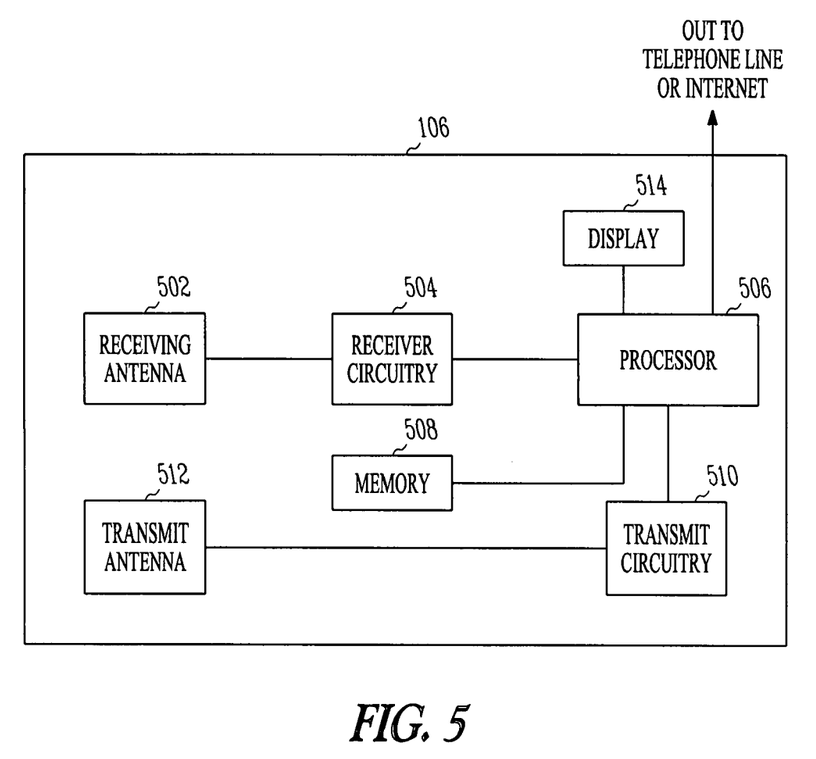
FIG. 5 is a block diagram illustrating the components of the controller of FIG. 1 in accordance with an example embodiment of the present application.

FIG. 5 is a block diagram illustrating the components of the controller 106 of FIG. 1 in accordance with the present application. In an embodiment, the controller 106 includes a receiving antenna 502. The controller 106 also includes receiver circuitry 504 for extracting the signal strength and/or ID information received from the anchor devices 104 and converting it to baseband digital signals. The controller 106 further includes a processor 506 for analyzing the data received from the anchor devices 104 in order to estimate the location of the one or more beaconing devices 102 based on that information. The controller 106 includes a memory 508 for storing that information over time so as to be able to construct the movement of the one or more beaconing devices 102 over time and process that data to create a log or map of the movement of the one or more beaconing devices 102 over time. Furthermore, the control node 106 may also includes transmit circuitry 510 and a transmit antenna 512 for sending signals and information to the anchor nodes. In some embodiments, the controller 106 may include programming for running the entire network. Such functionality typically would require that the controller not only be able to receive information from the anchor nodes, but also transmit information to them.

Most of the functionality described below is performed by the processor 506 of the controller, which can take on any reasonable form, such as a signal processor, a programmed microprocessor, a programmed PC, digital hardware, analog hardware, a state machine, combinations thereof, etc. The various functionalities may be referred to herein as steps or circuits. It should be understood that these terms are used generically and are not intended to denote any particular hardware or software for performing the functionalities.

In some embodiments, an algorithm is employed by the controller 106 to estimate the location of the monitored person or object as a function of the received signal power levels. The algorithm considers the relative multiple signal strengths recorded by the multiple anchoring devices 104, calculates the estimate distances between the beaconing device 102 and each anchor device 104 as a function of those relative signal strengths, and multilaterates the position of the beaconing device 102 as a function of the estimate distances. When calculating the estimated location of the beaconing device 102, a weighting factor is assigned to each estimated distance. Generally, an estimated distance by using a signal with a lower transmit power level weights over an estimated distance by using signal with a higher transmit power level.

Figure 6A:
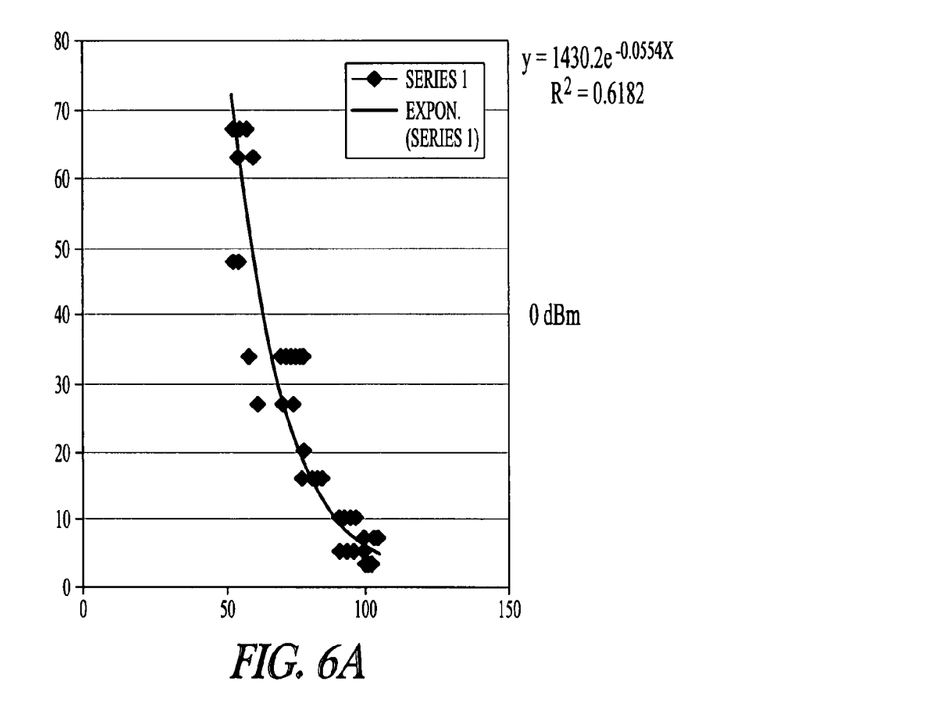
FIGS. 6A, 6B and 6C are graphs illustrating estimated distances as a function of received signal power levels.
Figure 6B:
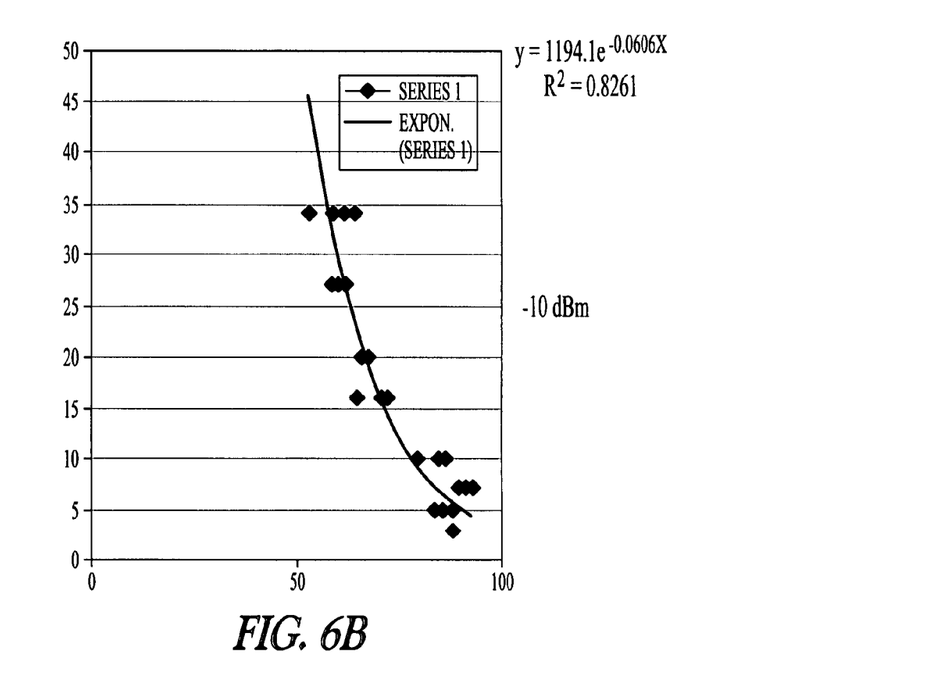
Figure 6C:
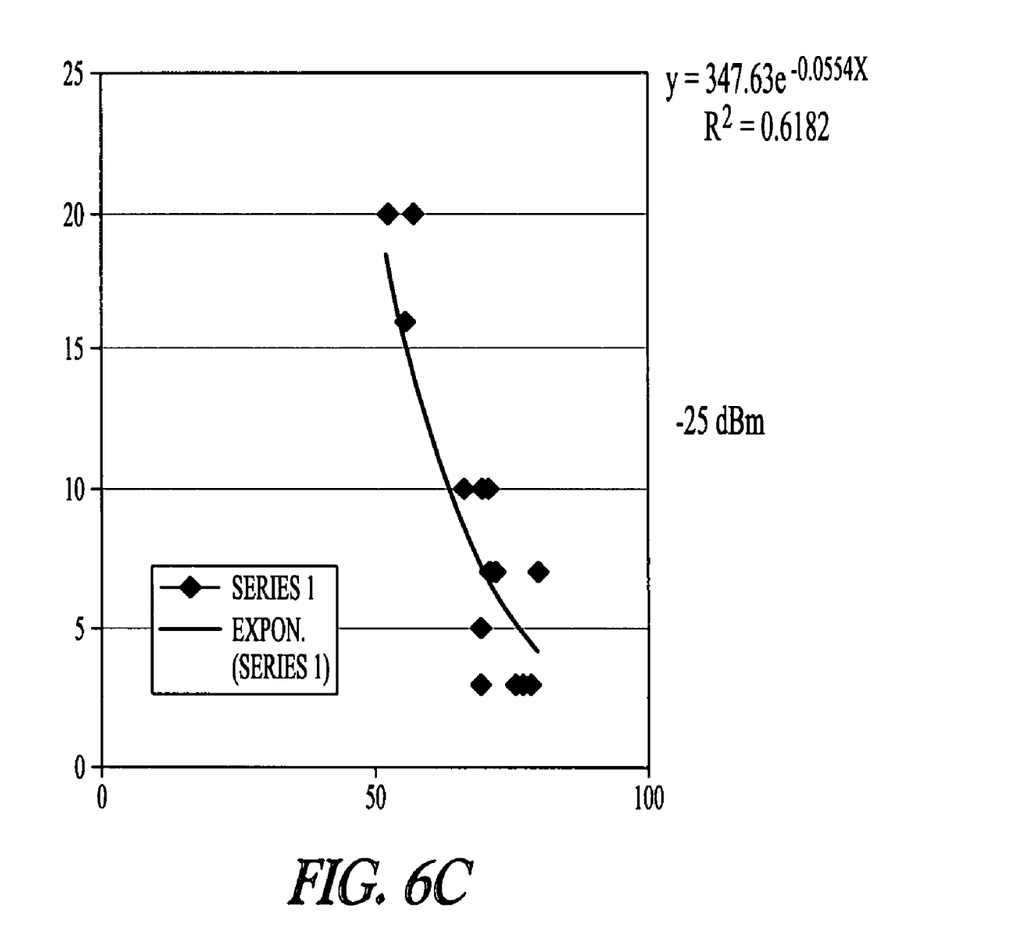

FIGS. 6A, 6B and 6C are graphs illustrating an estimated distance as a function of received signal power levels. Generally, the weaker the received signal strength is, the further away the beacon device 102 is from that a particular anchor device 104. Particularly, the points shown in FIGS. 6A-6C are actual data points obtained by empirical measurements. Solid lines 601 in FIGS. 6A-6C illustrate the extrapolated averages of all of the data points in the range from 50 feet to 100 feet. Lines 601 essentially define the conversion from received signal strengths to estimated distances between the beaconing device 102 and an anchor device 104.

Figure 7:
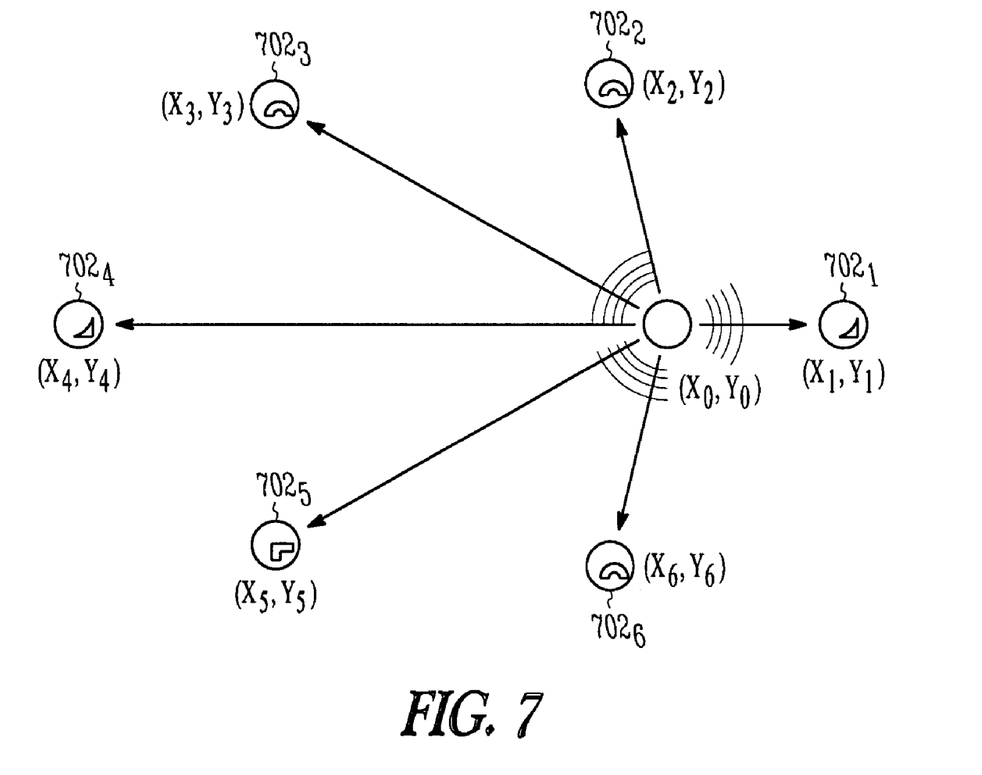
FIG. 7 is a diagram illustrating the relative positions of a beaconing device and six anchor devices for exemplary purposes.

FIG. 7 is a diagram illustrating the relative positions of a beaconing device 701 and six anchor devices $702_1$, $702_1$, $702_2$, $702_3$, $702_4$, $702_5$ and $702_6$ in accordance with an embodiment of the present application. In this embodiment, all of the anchor devices $702_1$, through $702_1$, and the beaconing device 701 are highly likely to be at essentially the same elevation (e.g., within about 2 feet of each other). A two-dimensional space is assumed, which is perfectly adequate for a single level house. However, as will be discussed further below, the present technique is easily extendable to three dimensions and therefore, easily implemented in a multi-floor house or other structure also.

In some embodiments, the estimated location of the beaconing device 701 can be obtained by solving an optimization problem to minimize a sum of squared distance errors over all of the anchor devices receiving multiple signals from the beaconing device between (A) and (B), in which (A) is each predicted distance between each anchor device and the beacon device, and (B) is each distance between each anchor device at a known location and the mobile beaconing device 701.

The distance error and the minimization problem can be respectively expressed in (1) and (2) as follows:

$$J_{ik} = \sqrt{(X_i - X_b)^2 + (Y_i - Y_b)^2} - d_{ik} \qquad (1)$$

$$\min_{X_b,Y_b} \sum_{i=1,k=1}^{n\times m} W_{ik} J_{ik}^2 \quad (2)$$

where
- i is an index identifying one of the known locations to position a particular anchor device;
- k is an index identifying one of the transmit power levels transmitted from the beaconing device;
- n is number of the known locations;
- m is number of the transmit power levels from the beaconing device;
- $X_b$ and $Y_b$ are estimated Euclidian coordinates of the beaconing device;
- $X_i$ and $Y_i$ are Euclidean coordinates of the known location i;
- $d_{ik}$ is an estimated distance between the beaconing device and the known location i as a function of a transmit power level of index k from the beaconing device and signal power level received by the anchor device i; and
- $W_{ik}$ is a weighting factor as a function of a transmit power level of index k transmitted from the beaconing device and a corresponding signal power level received by the anchor device i, wherein $W_{ik}$ decreases while the power level of index k increases.

In accordance with this embodiment, a weighting factor $W_{ik}$ is assigned to each estimated distance $d_{ik}$, and the weighting factor to an estimated distance using a lower transmit power level weights over another weighting factor using a higher transmit power level.

In some embodiments, the relationship of the weighting factor $W_{ik}$, the transmit power level of index k from the beaconing device, and the corresponding signal strength received by an anchor device i can be expressed using one of the following formulas:

$$W_{ik} = \frac{\text{the signal strength received by the anchor device } i}{\text{the transmit power level of index } k} \quad (3)$$

$$W_{ik} = \exp\left(\frac{\text{the signal strength received by the anchor device } i}{\text{the transmit power level of index } k}\right) \quad (4)$$

$$W_{ik} = \left(\frac{\text{the signal strength received by the anchor device } i}{\text{the transmit power level of index } k}\right)^p \quad (5)$$

where p is a real number.

For formula (5), the value of p may depend on the implementation choices. For example, p may be equal to 2 to get a squared rate of weighting. However, when the range decreases in buildings, where there is a lot of interferences, the value of p may be chosen to be 3 or 4.

Referring to FIG. 7, supposing each time the mobile beaconing device 701 transmits two signals with two different power levels (k=2), the values for $X_b, Y_b$ that yield the smallest value of $(J_{11}+J_{21}+J_{31}+J_{41}+J_{51}+J_{61})+(J_{12}+J_{22}+J_{32}+J_{42}+J_{52}+J_{62})$ are the estimated coordinates of the mobile beaconing device 701.

In some embodiments, the formula (1) and (2) can be extended to three dimensions for a multilevel building or an environment in which the tracked person or object may change position in elevation, then the following formula can be used:

$$J_{ik} = \sqrt{(X_i - X_b)^2 + (Y_i - Y_b)^2 + (Z_i - Z_b)^2} - d_{ik} \quad (6)$$

$$\min_{X_b,Y_b,Z_b} \sum_{i=1,k=1}^{n\times m} W_{ik} J_{ik}^2 \quad (7)$$

Figure 8:
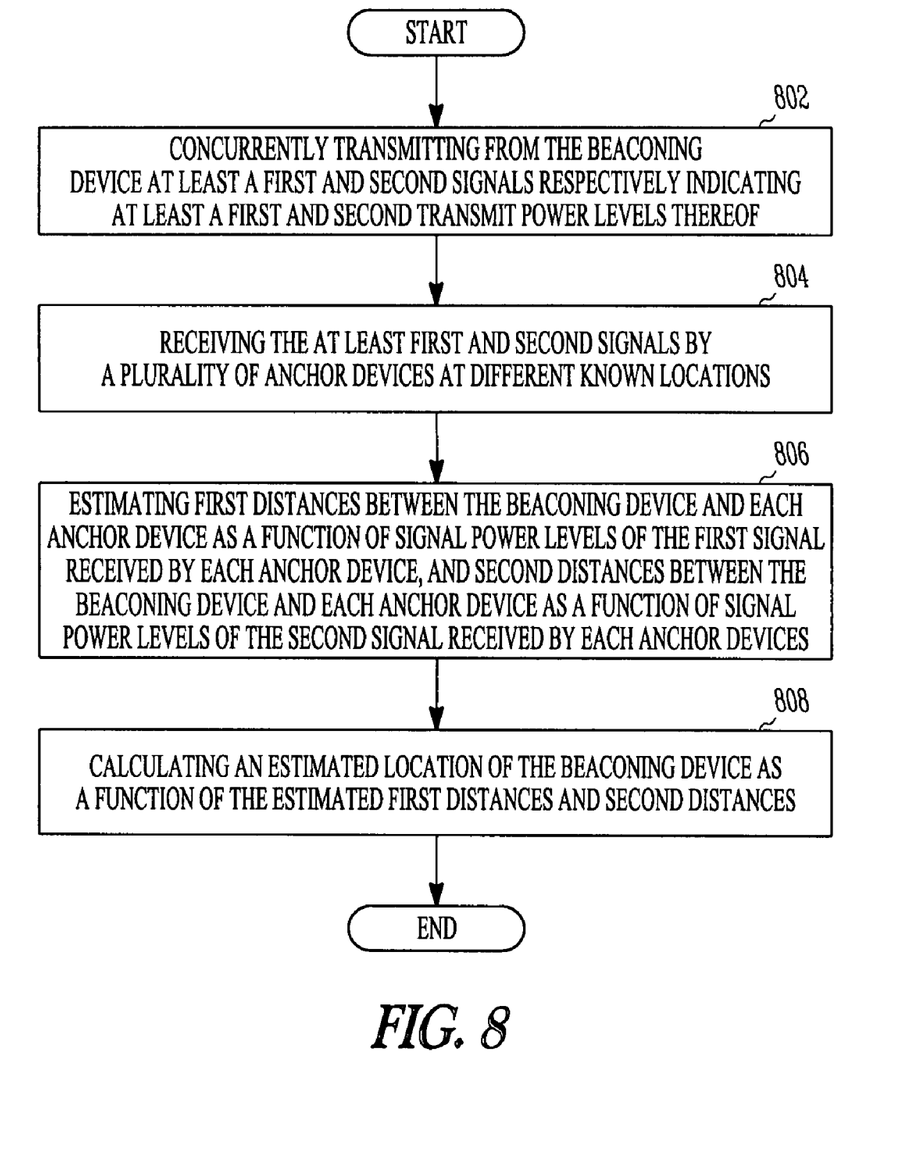
FIG. 8 is a flow chart illustrating a method of estimating location of a mobile beaconing device within a building in accordance with an example embodiment of the present application.

FIG. 8 is a flow chart illustrating a method of estimating location of a mobile beaconing device 102 as shown in FIG. 1 within a building in accordance with an embodiment of the present application.

At 802, the mobile beaconing device 102 concurrently transmits at least first and second signals respectively indicating at least first and second transmit power levels thereof. For example, the first and second transmit power levels may be 0 dBm and −10 dBm respectively.

At 804, the plurality of anchor devices 104 at different known locations within the building receive the at least first and second signals transmitted from the mobile beaconing device 102. In some embodiments, each anchor device 104 can determine each signal power level received by itself and the transmit power level from the beaconing device 102. Each anchor device 104 may send such information as well as the ID of itself to a control node 106.

At 806, the control node 106 estimates first distances between the beaconing device 102 and each anchor device 104 as a function of signal power levels of the first signal received by each anchor device 104 (e.g., 0 dBm), and second distances between the beaconing device 102 and each anchor device 104 as a function of signal power levels of the second signal received by each anchor device 104 (e.g., −10 dBm).

At 808, the control node 106 calculates an estimated location of the beaconing device 102 as a function of the estimated first distances and second distances obtained in step 806. In some embodiments, curves e.g., shown in FIGS. 6A-6C can be used to estimate the distances. In some embodiments, when calculating the estimated location of the beaconing device 102, a weighting factor is assigned to each estimated distance as a function of the transmit power level transmitted from the beaconing device 102 and the corresponding signal power level received by each anchor device 104, and a weighting factor to an estimated distance using a lower transmit power level weights over another weighting factor to another estimated distance using a higher power level. The formulas (1)-(7) discussed previously can be used to calculate the estimated location of the mobile beaconing device 102 within the building.

Figure 9:
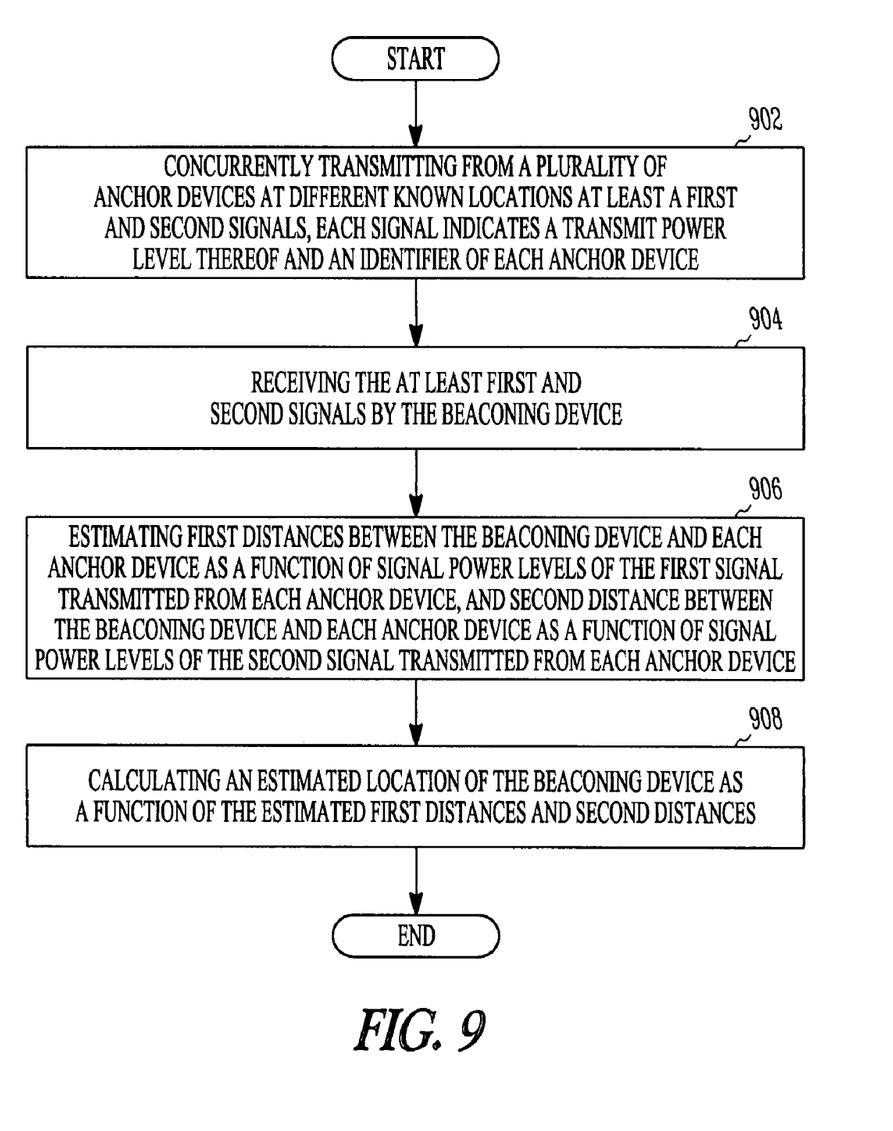
FIG. 9 is a flow chart illustrating a method of estimating location of a mobile beaconing device within a building in accordance with another example embodiment of the present application.

FIG. 9 is a flow chart illustrating a method of estimating location of a mobile device 102 within a building in accordance with another embodiment of the present application.

At 902, a plurality of anchor devices 104 at different known locations concurrently transmits at least first and second signals, each signal indicates a transmit power level thereof and an identifier of each anchor device 104. In an embodiment, each anchor device 104 may transmit multiple signals with different power levels, like 0 dBm, −10 dBm, −25 dBm, etc.

At 904, the mobile device 102 receives the at least first and second signals transmitted from the plurality of anchor devices 104. In some embodiments, the mobile device 102 may receive an information that includes each transmit power level and corresponding ID thereof transmitted each time from each anchor device 104, and can determine each signal power level received by the mobile device 102. The mobile device 102 may send such information to a control node 106.

At 906, the control node 106 estimates first distances between the mobile device 102 and each anchor device 104 as a function of signal power levels of the first signal transmitted from each anchor device 104 (e.g., 0 dBm), and second distances between the mobile device 102 and each anchor device 104 as a function of signal power levels of the second signal transmitted from each anchor device 104 (e.g., −10 dBm).

At 908, the control node 106 calculates an estimated location of the mobile device 102 as a function of the estimated first distances and second distances. In some embodiments, when calculating the estimated location of the mobile device 102, a weighting factor is assigned to each estimated distance as a function of the transmit power level transmitted from each anchor device 104 and the corresponding signal power level received by the mobile device 102, and a weighting factor to an estimated distance using a lower transmit power level weights over another weighting factor to another estimated distance using a higher power level. The formulas (3)-(5) described previously and formulas (8)-(9) discussed below can be used to calculate the estimated location of the mobile device 102 within the building.

$$J_{ik} = \sqrt{(X_i - X_b)^2 + (Y_i - Y_b)^2} - d_{ik} \quad (8)$$

$$\min_{X_b, Y_b} \sum_{i=1,k=1}^{n \times m} W_{ik} J_{ik}^2 \quad (9)$$

where
i is an index identifying one of the known locations;
k is an index identifying one of the signal transmitted from each anchor device;
n is number of the known locations;
m is number of the power levels transmitted from each anchor device;
$X_b$ and $Y_b$ are estimated Euclidian coordinates of the beaconing device;
$X_i$ and $Y_i$ are Euclidean coordinates of the known location i;
$d_{ik}$ is an estimated distance between the beaconing device and the known location i as a function of a transmit power level of index k from the anchor device i and a corresponding signal power level received by the beaconing device; and
$W_{ik}$ is a weighting factor as a function of a transmit power level of index k from the anchor device i and a corresponding signal power level received by the beaconing device, wherein $W_{ik}$ decreases while the power level of index k increases.

In some embodiments, the formula (8) and (9) can be extended to three dimensions for a multilevel building or an environment in which the tracked person or object may change position in elevation, then the following formula can be used:

$$J_{ik} = \sqrt{(X_i - X_b)^2 + (Y_i - Y_b)^2 + (Z_i - Z_b)^2} - d_{ik} \quad (10)$$

$$\min_{X_b, Y_b, Z_b} \sum_{i=1,k=1}^{n \times m} W_{ik} J_{ik}^2 \quad (11)$$

By using multiple signals with multiple different transmit power levels, the present application greatly reduces the receiver saturation and multipath effects, which occurs particularly when a signal transmitted with a high power level from a transmitter hits the receiver within short distances, and highly distorts the calculation of the estimate location of the mobile device.

While there has been described herein the principles of the application, it is to be understood by those skilled in the art that this description is made only by way of example and not as a limitation to the scope of the application. Accordingly, it is intended by the appended claims, to cover all modifications of the application which fall within the true spirit and scope of the application.

The invention claimed is:

1. A method of estimating location of a beaconing device within a building, comprising:
concurrently transmitting from the beaconing device at least first and second signals respectively indicating at least first and second transmit power levels thereof;
receiving the at least first and second signals by a plurality of anchor devices at different known locations;
estimating first distances between the beaconing device and each anchor device as a function of signal power levels of the first signal received by each anchor device, and second distances between the beaconing device and each anchor device as a function of signal power levels of the second signal received by each anchor devices;
calculating an estimated location of the beaconing device as a function of the estimated first distances and second distances; and
when calculating the estimated location of the beaconing device, assigning a weighting factor to each estimated distance as a function of the transmit power level transmitted from the beaconing device and the corresponding signal power level received by each anchor device, wherein the weighting factor to each estimated distance using a lower power level weights over the weighting factor using a higher power level.

2. The method of claim 1, further comprising:
periodically repeating transmission of the at least first and second signals from the beaconing device at a constant time interval.

3. The method of claim 2, wherein the constant time interval is in a range from 0.5 second to 1 minute.

4. The method of claim 1, wherein each signal is radio frequency (RF) signal.

5. A method of estimating location of a beaconing device within a building, comprising:
concurrently transmitting from the beaconing device at least first and second signals respectively indicating at least first and second transmit power levels thereof;
receiving the at least first and second signals by a plurality of anchor devices at different known locations;
estimating first distances between the beaconing device and each anchor device as a function of signal power levels of the first signal received by each anchor device, and second distances between the beaconing device and each anchor device as a function of signal power levels of the second signal received by each anchor devices;
calculating an estimated location of the beaconing device as a function of the estimated first distances and second distances, wherein calculating the estimated location of the beaconing device is performed by solving:

$$J_{ik} = \sqrt{(X_i - X_b)^2 + (Y_i - Y_b)^2 + (Z_i - Z_b)^2} - d_{ik}$$

-continued $$\min_{X_b,Y_b,Z_b} \sum_{i=1,k=1}^{n \times m} W_{ik} J_{ik}^2$$

where
i is an index identifying one of the known locations;
k is an index identifying one of the transmit power levels transmitted from the beaconing device;
n is number of the known locations;
m is number of the transmit power levels transmitted from the beaconing device;
$X_b$, $Y_b$ and $Z_b$ are estimated Euclidian coordinates of the beaconing device;
$X_i$, $Y_i$ and $Z_i$ are Euclidean coordinates of the known location i;
$d_{ik}$ is an estimated distance between the beaconing device and the known location i as a function of a transmit power level of index k transmitted from the beaconing device and signal power level received by the anchor device i; and
$W_{ik}$ is a weighting factor as a function of a transmit power level of index k transmitted from the beaconing device and a corresponding signal power level received by the anchor device i, wherein $W_{ik}$ decreases while the power level of index k increases.

6. The method of claim 5, wherein $$W_{ik} = \frac{\text{the signal strength received by the anchor device } i}{\text{the transmit power level of index } k}.$$

7. The method of claim 5, wherein $$W_{ik} = \exp\left(\frac{\text{the signal strength received by the anchor device } i}{\text{the transmit power level of index } k}\right).$$

8. The method of claim 5, wherein $$W_{ik} = \left(\frac{\text{the signal strength received by the anchor device } i}{\text{the transmit power level of index } k}\right)^p.$$

9. A method of estimating location of a mobile beaconing device within a building, comprising:
concurrently transmitting from a plurality of anchor devices at different known locations at least first and second signals, each signal indicates a transmit power level thereof and an identifier of each anchor device;
receiving the at least first and second signals by the beaconing device;
estimating first distances between the beaconing device and each anchor device as a function of signal power levels of the first signal transmitted from each anchor device, and second distances between the beaconing device and each anchor device as a function of signal power levels of the second signal transmitted from each anchor device;
calculating an estimated location of the beaconing device as a function of the estimated first distances and second distances; and
when calculating the estimated location of the beaconing device, assigning a weighting factor to each estimated distance as a function of the transmit power level transmitted from each anchor device and the corresponding signal power level received by the beaconing device, wherein the weighting factor to each estimated distance using a lower power level weights over the weighting factor using a higher power level.

10. The method of claim 9, further comprising:
periodically repeating transmission of the at least first and second signals from each anchor device at a constant time interval.

11. A method of estimating location of a mobile beaconing device within a building, comprising:
concurrently transmitting from a plurality of anchor devices at different known locations at least first and second signals, each signal indicates a transmit power level thereof and an identifier of each anchor device;
receiving the at least first and second signals by the beaconing device;
estimating first distances between the beaconing device and each anchor device as a function of signal power levels of the first signal transmitted from each anchor device, and second distances between the beaconing device and each anchor device as a function of signal power levels of the second signal transmitted from each anchor device;
calculating an estimated location of the beaconing device as a function of the estimated first distances and second distances, wherein calculating the estimated location of the beaconing device is performed by solving:

$$J_{ik} = \sqrt{(X_i - X_b)^2 + (Y_i - Y_b)^2 + (Z_i - Z_b)^2} - d_{ik}$$

$$\min_{X_b,Y_b,Z_b} \sum_{i=1,k=1}^{n \times m} W_{ik} J_{ik}^2$$

where
i is an index identifying one of the known locations;
k is an index identifying one of the signal transmitted from each anchor device;
n is number of the known locations;
m is number of the power levels transmitted from each anchor device;
$X_b$, $Y_b$ and $Z_b$ are estimated Euclidian coordinates of the beaconing device;
$X_i$, $Y_i$ and $Z_i$ are Euclidean coordinates of the known location i;
$d_{ik}$ is an estimated distance between the beaconing device and the known location i as a function of a transmit power level of index k from the anchor device i and a corresponding signal power level received by the beaconing device; and
$W_{ik}$ is a weighting factor as a function of a transmit power level of index k from the anchor device i and a corresponding signal power level received by the beaconing device,
wherein $W_{ik}$ decreases while the power level of index k increases.

12. A system for estimating location of a mobile beaconing device within a building, comprising:
a beaconing device for concurrently transmitting at least first and second signals, each signal indicating the transmit power level thereof;

a plurality of anchor devices positioned at different known locations for receiving the at least first and second signals;

a first circuit for estimating first distances between the beaconing device and each anchor device as a function of signal power levels of the first signal received by each anchor device, and second distances between the beaconing device and each anchor device as a function of signal power levels of the second signal received by each anchor devices; and a second circuit for calculating a estimated location of the beaconing device as a function of the estimated first distances and second distances, wherein the second circuit assigns a weighting factor, when calculating the estimated location of the beaconing device, to each estimated distance as a function of the transmit power level transmitted from each anchor device and the corresponding signal power level received by the beaconing device, wherein the weighting factor to each estimated distance using a lower power level weights over the weighting factor using a higher power level.

13. The system of claim 12, wherein the beaconing device periodically repeats transmission of the at least first and second signals from each anchor device at a constant time interval.

14. A system for estimating location of a mobile beaconing device within a building, comprising:

a beaconing device for concurrently transmitting at least first and second signals, each signal indicating the transmit power level thereof;

a plurality of anchor devices positioned at different known locations for receiving the at least first and second signals;

a first circuit for estimating first distances between the beaconing device and each anchor device as a function of signal power levels of the first signal received by each anchor device, and second distances between the beaconing device and each anchor device as a function of signal power levels of the second signal received by each anchor devices; and a second circuit for calculating a estimated location of the beaconing device as a function of the estimated first distances and second distances, wherein the second circuit calculates the estimated location of the beaconing device by solving:

$$J_{ik} = \sqrt{(X_i - X_b)^2 + (Y_i - Y_b)^2 + (Z_i - Z_b)^2} - d_{ik}$$

$$\min_{X_b, Y_b, Z_b} \sum_{i=1, k=1}^{n \times m} W_{ik} J_{ik}^2$$

where i is an index identifying one of the known locations;

k is an index identifying one of the transmit power levels transmitted from the beaconing device;

n is number of the known locations;

m is number of the transmit power levels transmitted from the beaconing device;

$X_b$, $Y_b$ and $Z_b$ are estimated Euclidian coordinates of the beaconing device;

$X_i$, $Y_i$ and $Z_i$ are Euclidean coordinates of the known location i;

$d_{ik}$ is an estimated distance between the beaconing device and the known location i as a function of a transmit power level of index k transmitted from the beaconing device and signal power level received by the anchor device i; and $W_{ik}$ is a weighting factor as a function of a transmit power level of index k transmitted from the beaconing device and a corresponding signal power level received by the anchor device i, wherein $W_{ik}$ decreases while the power level of index k increases.

15. A system for estimating location of a mobile beaconing device within a building, comprising:

a plurality of anchor devices at different known locations for concurrently transmitting at least first and second signals, each signal indicates a transmit power level thereof and an identifier of each anchor device;

a beaconing device for receiving the at least first and second signals transmitted from the plurality of anchor devices;

a first circuit for estimating first distances between the beaconing device and each anchor device as a function of signal power levels of the first signal transmitted from each anchor device, and second distances between the beaconing device and each anchor device as a function of signal power levels of the second signal transmitted from each anchor device; and a second circuit for calculating an estimated location of the beaconing device as a function of the estimated first distances and second distances, wherein the second circuit assigns a weighting factor, when calculating the estimated location of the beaconing device, to each estimated distance as a function of the transmit power level transmitted from each anchor device and the corresponding signal power level received by the beaconing device, wherein the weighting factor to each estimated distance using a lower power level weights over the weighting factor using a higher power level.

16. The system of claim 15, wherein each anchor device periodically repeats transmission of the at least first and second signals at a constant time interval.

* * * * *